United States Patent
Müller

(10) Patent No.: US 7,469,714 B2
(45) Date of Patent: Dec. 30, 2008

(54) VALVE, ESPECIALLY A GAS SAFETY VALVE

(75) Inventor: Stephan Müller, Zweibrücken (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 289 days.

(21) Appl. No.: 10/573,759

(22) PCT Filed: Sep. 18, 2004

(86) PCT No.: PCT/EP2004/010507

§ 371 (c)(1),
(2), (4) Date: Mar. 29, 2006

(87) PCT Pub. No.: WO2005/052422

PCT Pub. Date: Jun. 9, 2005

(65) Prior Publication Data

US 2007/0034263 A1    Feb. 15, 2007

(30) Foreign Application Priority Data

Oct. 31, 2003    (DE) ................. 103 50 914

(51) Int. Cl.
*F16K 15/02* (2006.01)
(52) U.S. Cl. .................. 137/540; 137/469; 251/337
(58) Field of Classification Search .......... 137/469, 137/540; 251/337
See application file for complete search history.

(56) References Cited

U.S. PATENT DOCUMENTS

| | | | |
|---|---|---|---|
| 763,208 A | 6/1904 | Robinson | |
| 2,110,481 A * | 3/1938 | Crocker | 137/469 |
| 2,820,474 A | 1/1958 | Greenwood et al. | |
| 3,620,501 A | 11/1971 | Friedell | |
| 4,726,395 A * | 2/1988 | Howes et al. | 137/469 |
| 5,094,266 A | 3/1992 | Ledbetter | |
| 5,791,373 A | 8/1998 | Adams | |

FOREIGN PATENT DOCUMENTS

| | | | |
|---|---|---|---|
| DE | 71 07 844 | | 6/1971 |
| DE | 2 129 800 | | 1/1973 |
| DE | 26 40 470 | | 3/1977 |
| DE | 26 00 678 | | 7/1977 |
| DE | 77 07 893 | | 9/1977 |
| DE | 40 34 531 | | 3/1992 |
| FR | 2410773 | | 6/1979 |
| GB | 1 446 704 | * | 8/1976 |
| GB | 1446704 | | 8/1976 |

* cited by examiner

*Primary Examiner*—Kevin L Lee
(74) *Attorney, Agent, or Firm*—Roylance, Abrams, Berdo & Goodman, L.L.P.

(57) ABSTRACT

A valve, especially a gas safety valve includes a fluid-guiding path (32) that can be sealed by a sealing device (30) provided with a sealing surface (34). The sealing surface can be brought against an abutment surface (36) of an abutment part (38), and is at least partially inserted into a receiving region (40) of a receiving part (42). As the sealing device (30) is fixed inside the receiving region (40) in such a way that a counter-holding part (54) can be brought into contact with the sealing device (30) by connection to the receiving part (42), the sealing device is arranged inside the receiving region of the receiving part and is securely held in the receiving region.

12 Claims, 2 Drawing Sheets

VALVE, ESPECIALLY A GAS SAFETY VALVE

Figure 1:
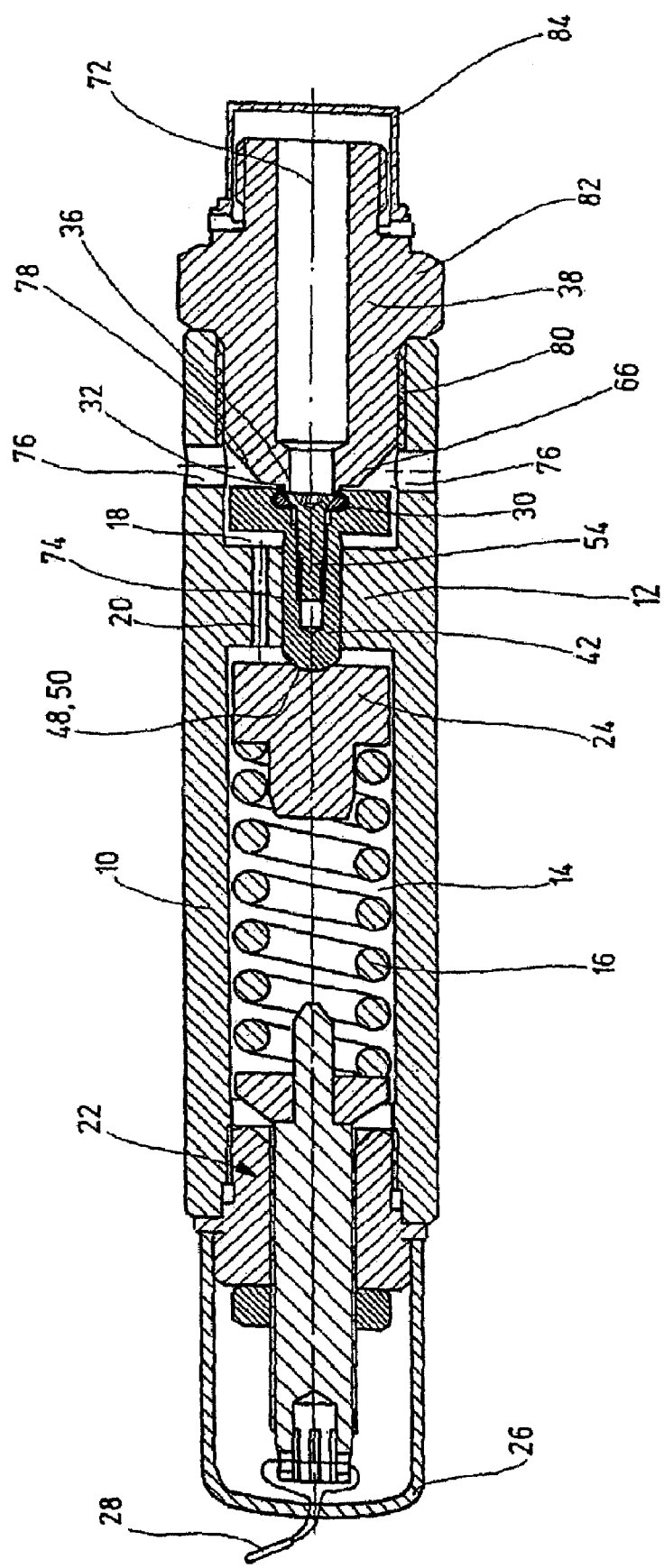

The invention relates to a valve, especially a gas safety valve, with a fluid-guiding path which can be sealed by a sealing device and which for the pertinent sealing is provided with a sealing surface which can be brought into contact with the contact surface of a contact part and which is inserted at least partially into the receiving space of a receiving part.

In the disclosed solutions, as are readily available on the market in a plurality of versions and embodiments, the sealing device which generally consists of a conventional O-ring of elastomer material is placed in an annular receiving space of a receiving part which, designed as an annular groove, enables the O-sealing ring to be accommodated, the latter ending flat or projecting with a definable projection with its sealing surface flush with the front of the receiving part. Preferably in the known solutions the cross sectional shapes of the O-sealing ring are rectangular and the indicated receiving part interacts with a compression spring as an energy storage device which defines the closing or setting pressure of the valve, for example on the order of magnitude of 0 to 370 bar. This sealing surface is supported in the closed or blocking state of the valve on the contact surface of a contact part which, designed as a screw-in part, is permanently joined to the valve housing and has a center channel for supplying the pressurized fluid, for example in the form of a gas, if the valve is designed as a gas safety valve. If the fluid pressure or gas pressure rises above the given setting pressure, the receiving part together with the sealing device in the form of an O-sealing ring is moved against the action of the compression spring and the blocked fluid-guiding path which has been sealed until then is cleared for passage of the fluid (gas) in the direction of a port opening in the valve housing, for example in the form of a blow-off opening, if the valve is a gas safety valve. If the fluid pressure or gas pressure decreases again in the center channel of the contact body, the energy storage device in the form of the compression spring presses the receiving part back into its sealing position in which the sealing surface of the sealing device comes into compressive contact with the contact surface of the indicated contact part.

Depending on the load cycle numbers which arise, that is, clearance and blocking of the fluid-guiding path by the sealing device, on the one hand the situation arises that the exposed sealing surface is subjected to strong, wearing stresses, and on the other hand it has been shown in practice that processes of sticking of the sealing device to the contact part occur. This results in the sealing device being pulled out of the receiving part; this leads to the sealing device becoming unusable and thus the operating reliability of the valve is adversely affected. This is a factor when it is used in safety-relevant areas, for example as a gas safety valve.

On the basis of this prior art the object of the invention is to further improve the known valve solutions such that the described disadvantage does not occur, especially that the operating reliability of the valve in any operating state is not endangered, without the production costs for the valve increasing compared to known solutions. Furthermore, with the valve as claimed in the invention ease of maintenance and service will be enhanced. This object is achieved with a valve having the features of claim 1 in its entirety.

In that, as specified in the characterizing part of claim 1, the sealing device is fixed within the receiving space in that a counterstay part by connection to the receiving part can be brought into contact with the sealing device, the sealing device is chambered within the receiving space of the receiving part and is compressed or secured there in its position, such that even in processes of sticking of the sealing surface to the contact surface of the contact part the sealing device cannot be unintentionally pulled out of the receiving space. In practical tests it has also been found that even for very high cycle numbers and short cycle times, in which the fluid-guiding path is blocked with sealing or cleared, the sealing device remains in its position within the receiving space of the receiving part so that the operating reliability of the valve is ensured in each instance. This solution as claimed in the invention is therefore recommended especially for use in safety relevant areas, for example for use in gas safety valves, where the desired sealing action plays a major part. Since the valve solution as claimed in the invention manages with essentially the same components as the known valves, it is not expensive to implement, and due to its long-lasting operating reliability maintenance and service efforts are reduced so that overall the solution as claimed in the invention can be regarded as maintenance- and service-friendly.

By preference the counterstay part may be fixed within the receiving part by means of a screw connection, the counterstay part being designed as a countersunk screw and with its tapering head surfaces the sealing device is pressed into the receiving space of the receiving part, with increasing screw-in depth the pertinent compression force increasing. By selecting the screw-in depth, the fixing force for the sealing device in the receiving part can be defined.

In another preferred embodiment of the valve as claimed in the invention, the counterstay part is screwed into the receiving part until an annular sealing surface emerges from the sealing gap between the counterstay part and the receiving part. In this way, the effective surface of the ring seal can be reduced, as a result of the compressive contact with the counterstay part the sealing action of the sealing surface increasing, which surface with pretensioning can thus be brought into contact with the contact surface of the contact part. This essentially yields linear sealing contact of the indicated parts with an increased sealing force. Furthermore, in this way the harmful application surface of the sealing surface for the contact surface is reduced for the contact part; this preserves the seal.

Other advantageous embodiments of the valve as claimed in the invention are the subject matter of the other dependent claims.

The valve as claimed in the invention will be detailed below using the drawings which are schematic and not to scale.

Figure 2:
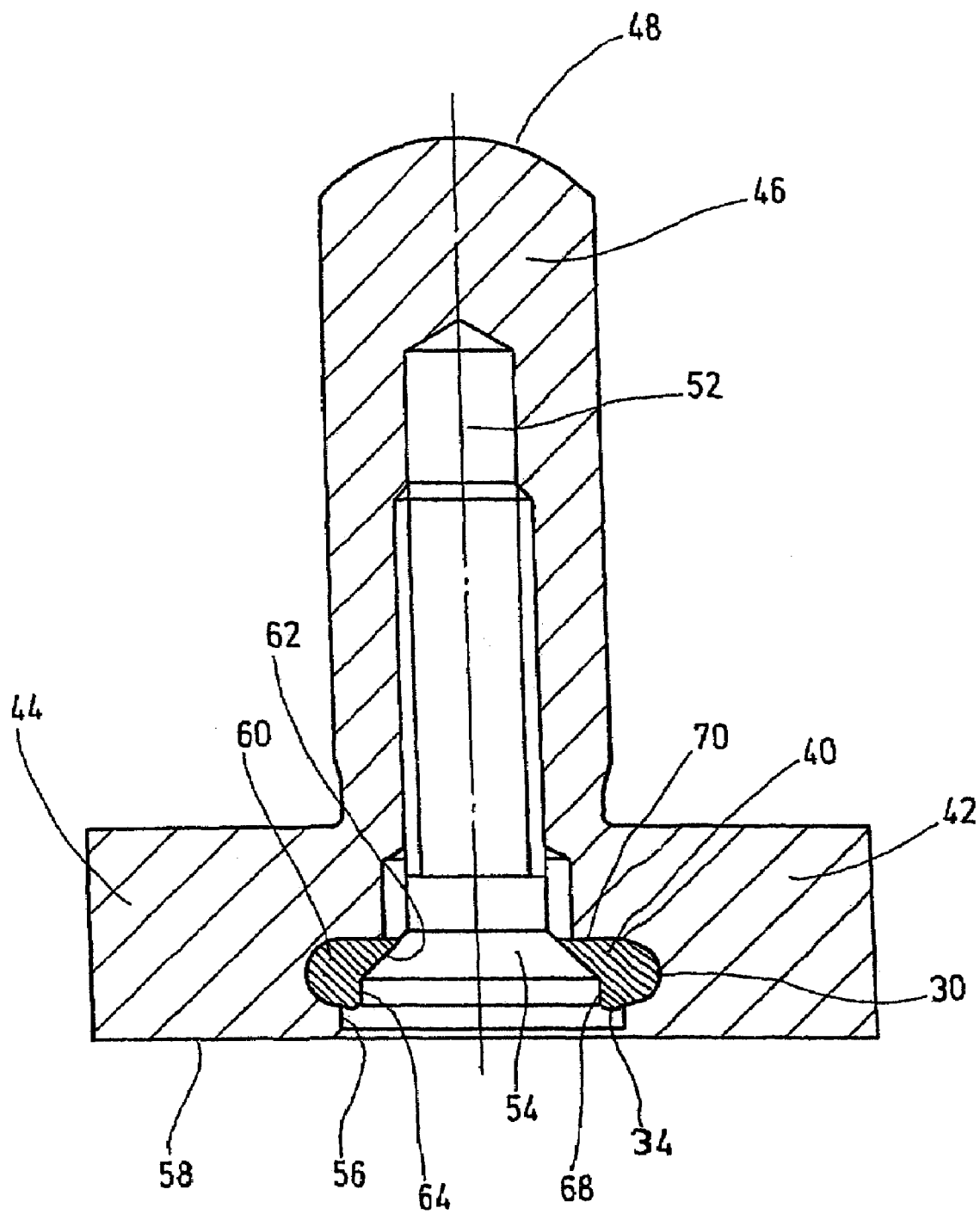

FIG. 1 shows a longitudinal section through the valve, designed as a gas safety valve;

FIG. 2 likewise shows in a longitudinal section an enlargement of the receiving part as shown in FIG. 1 in a vertical configuration;

The valve shown in FIG. 1 in a longitudinal section presents a so-called gas safety valve with a valve housing 10 which is divided when viewed in the direction of looking at FIG. 1 at a right angle by a partition 12. This partition 12 divides the valve housing 10 into a receiving chamber 14 for seating an energy storage device in the form of a compression spring 16 and into a fluid chamber 18. To prevent impediments to actuation, the receiving chamber 14 and the fluid chamber 18 are interconnected by way of an equalization hole 20 which extends through the partition 12. The compression spring 16 is supported with its one free end, viewed in the direction of looking at FIG. 1, on the left side on a setting means which is designated as a whole as 22 and with its other end on the support part 24. This structure is conventional in a gas safety valve so that it will not be detailed here. In order to protect the setting means 22 against unintentional adjustment, it is provided to the outside with a cap 26 and is additionally protected by way of a lead seal 28.

The valve furthermore has a sealing device 30 which is used to block the fluid-guiding path 32 with sealing or to clear it. For this sealing the sealing device 30 is provided with a sealing surface 34 which is exposed on the front (see FIG. 2) and which can be brought into contact with the contact surface 36 of a contact part 38. Furthermore the sealing device 30 is otherwise inserted into the receiving space 40 of a receiving part 42. The indicated receiving part 42 on its one end has a ring flange 44 which is provided toward the other end with a peg-like extension 46. Furthermore, the receiving part 42 on its end facing the energy storage device (compression spring 16) has a convex guide surface 48 for permanent application on the corresponding concave baffle 50 of the support part 24 on which in turn the energy storage device (compression spring 16) is supported.

The receiving space 40 detailed in FIG. 2 consists essentially of a groove-like receiving channel in the ring flange 44, the receiving space 40 oriented to the inside ending in a screw-in opening 52 which is designed for seating a counterstay part 54 designed as a countersunk head screw. The indicated receiving space 40 ends to the inside in the screw-in opening 52, the latter viewed in the direction of looking at FIG. 2 being widened from top to bottom in the form of a shoulder for seating the countersunk head screw 54. In particular, the bottom end of the receiving space 50 is configured offset by a definable path distance 56 as the so-called screw-in depth. The annular sealing surface 34 of the sealing device 30 is configured offset by this path distance 56 relative to the lower free front surface 58 so that it is accordingly protected by the indicated reverse offset against damage, wear, and abrasion. The sealing device 30 consists basically of an annular sealing means 60, especially of an O-ring of elastomer material, such as for example nitrile-butadiene rubber (NBR). Other cross sectional geometries are conceivable here, for example sealing means 60 with a gasket with a square cross section.

The deformation shown in FIG. 2 arises from the fact that when the counterstay part 54 in the form of a countersunk head screw has been screwed in, especially due to the effect of the tapering head surfaces 62, the sealing means 60 is compressed and in this way follows the head surfaces 62. The sealing device 30 is pressed into the receiving space 40 of the receiving part 42 by the counterstay part 54 such that with increasing screw-in depth the pertinent compression force is increased. In the process the counterstay part 54 is screwed into the receiving part 42 until the annular sealing surface 34 emerges from the sealing gap 64 between the counterstay part 54 and the receiving part 42.

To form the seal seat, the contact part 38 on its end facing the receiving part 42 is provided with a ring flange 66 (see FIG. 1) which on its free side forms the aforementioned contact surface 36 which interacts with the annular sealing surface 34, in this way a type of line contact between the indicated surfaces 34, 35 arising. In order to secure the counterstay part 54 in its position, there can be locking by means of a conventional adhesive (Loctite). In addition, the sealing means 60 is supported on the annular surface 68 of the countersunk head screw in the area between its free outer side and the tapering head surface 62. In the secured state for the sealing means 60 this yields a shape with a convex arch in the direction of the receiving space 40 in the form of a crosspiece-like extension, with the formation of the linear sealing surface 34, and surface parts extending in a straight line in the area of the head surface 62 and the annular surface 68 of the countersunk head screw and in the form of a support surface 70 extending parallel to the free front side 58 of the ring flange 44 (see FIG. 2).

The contact part 38 has a center channel 72 which performs the function of supplying the pressurized fluid (gas), at the opening pressure (between 0 and 350 bar) specifiable by the energy storage device (compression spring 16) the sealing device 30 clearing the fluid-guiding path 32 by the receiving part 42 being pushed against the action of the compression spring 16, that is, to the left viewed in the direction of looking at FIG. 1, and in doing so rising off the valve seat in the form of the ring flange 66 of the contact part 38. The maximum free travel path for the receiving part 42 is dictated by the ring flange 44 striking the partition 12.

In order to avoid impediments in operation, the guide surface 48 and the baffle 50 are made convex and concave so that transverse offset in the displacement motion of the receiving part 42 during its travel within the chamber wall 12 can be equalized by way of the peg-like extension 46 which is guided in the center hole 74 of the partition 12. When the indicated fluid-guiding path 32 has been cleared, it ends in the blow-off openings 76 in the valve housing 10 which extend for this purpose through the valve housing wall diametrically opposite each other. To facilitate this discharge motion for the fluid, the contact part 38 in the direction of its ring flange 66 is equipped with a tapering guide surface 78 which for this purpose facilitates triggering for the ring flange 44 of the receiving part 42. If the pressure in the center channel 72 drops again, under the influence of the compression spring 16 the sealing device closes and the fluid-guiding path 32 is in turn blocked, the pertinent blocking position being the subject matter of FIG. 1.

The indicated contact part 38 is screwed into the free end of the valve housing 10 by way of a screw-in section 80 and is supported with a flange-like widening 82 on the free end of the valve housing 10. Furthermore, in the marketable state of the gas safety valve the opening of the center channel 72 is covered with a protective cap 84 which is removed accordingly before installation of the valve in the gas safety circuit. Since the receiving part 42 is guided without impediment in the partition 12 over its peg-like extension 46, the annular flange 44 of the receiving part 42 can have a corresponding radial distance relative to the inside wall of the fluid chamber 18.

With the valve as claimed in the invention and its sealing device 30, a safely functioning concept is implemented and it is ensured in each instance that the counterstay prevents the sealing means 60 from unintentionally leaving the receiving space 40 assigned to it.

The invention claimed is:

1. A valve, comprising:
    a valve housing having a partition therein dividing a receiving chamber and a fluid chamber in said valve housing, said partition having a center hole;
    a compression spring in said receiving chamber having a first free end on a setting means and a second free end on a support part, said support part having a baffle;
    a fluid-guiding path extending through said valve housing;
    a sealing device releasably sealing said fluid-guiding path and including a seal surface;
    a contact part mounted in said housing and having a contact surface releasably engageable with said sealing surface;
    a receiving part having a peg-like extension and a receiving space releasably receiving at least partially said contact surface, said sealing device being fixed within said receiving space, said extension being longitudinally movable in said center hole and engaging said baffle; and
    a counterstay, countersunk screw received in said receiving part and having tapered head surfaces pressing said sealing device into said receiving space and directly engaging said sealing device such that with increasing screw-in depth of said screw compression forces on said sealing device are increased.

2. A valve according to claim 1 wherein the valve is a gas safety valve.

3. A valve according to claim 1 wherein said sealing device on an annular seal.

4. A valve according to claim 3 wherein said annular seal is an o-ring of elastomeric material.

5. A valve according to claim 4 wherein said elastomeric material comprises nitril-butadiene rubber.

6. A valve according to claim 1 wherein said contact part is connected stationary to said valve housing; and
said screw is threadedly engaged with said receiving part.

7. A valve according to claim 1 wherein said screw is threaded into said receiving part until said sealing surface is formed thereby as being annular and emerges linearly from a sealing gap between said screw and said receiving part.

8. A valve according to claim 7 wherein said contact part comprises a ring flange on an end thereof facing said receiving part, said ring flange forming said contact surface.

9. A valve according to claim 1 wherein said contact part comprises a center channel to supply pressurized fluid; and
an opening pressure is defined by said spring when said sealing device clears said fluid-guiding path.

10. A valve according to claim 1 wherein said valve house comprises at least one blow-out opening forming an end of said fluid-guiding path.

11. A valve according to claim 1 wherein said contact part comprises a ring flange and a guide surface tapered in a direction of said ring flange.

12. A valve according to claim 1 wherein said receiving part comprises a convex guide part on an end thereof facing said spring; and
said baffle is correspondingly concave for engaging said convex guide part.

* * * * *